US012587455B2

(12) United States Patent
Joshi et al.

(10) Patent No.: US 12,587,455 B2
(45) Date of Patent: Mar. 24, 2026

(54) METHODS, SYSTEMS, AND DEVICES FOR ANALYZING NETWORK PERFORMANCE

(71) Applicant: Ruckus IP Holdings LLC, Claremont, NC (US)

(72) Inventors: Rajiv Joshi, Cupertino, CA (US); K. S. Keshava Murthy, Bengaluru (IN); Mayank Sourabh, Bengaluru (IN); Yang Han, Singapore (SG)

(73) Assignee: RUCKUS IP HOLDINGS LLC, Horsham, PA (US)

( * ) Notice: Subject to any disclaimer, the term of this patent is extended or adjusted under 35 U.S.C. 154(b) by 3 days.

(21) Appl. No.: 17/974,673

(22) Filed: Oct. 27, 2022

(65) Prior Publication Data

US 2023/0139992 A1 May 4, 2023

Related U.S. Application Data

(60) Provisional application No. 63/273,288, filed on Oct. 29, 2021.

(51) Int. Cl.
| | |
|---|---|
| *H04L 43/022* | (2022.01) |
| *H04L 43/106* | (2022.01) |
| *H04W 24/06* | (2009.01) |

(52) U.S. Cl.
CPC .......... *H04L 43/022* (2013.01); *H04L 43/106* (2013.01); *H04W 24/06* (2013.01)

(58) Field of Classification Search
CPC ..... H04L 43/022; H04L 43/106; H04W 24/06
See application file for complete search history.

(56) References Cited

U.S. PATENT DOCUMENTS

| | | | | |
|---|---|---|---|---|
| 11,102,273 | B2 * | 8/2021 | Shanks .................... | H04L 43/50 |
| 2003/0140140 | A1 * | 7/2003 | Lahtinen ................. | H04L 41/28 |
| | | | | 709/224 |
| 2012/0144015 | A1 * | 6/2012 | Jalan ...................... | H04L 67/56 |
| | | | | 709/224 |
| 2015/0222514 | A1 * | 8/2015 | Masuda .............. | G06F 11/3452 |
| | | | | 709/224 |
| 2016/0028603 | A1 * | 1/2016 | Chakrabarti ............ | H04L 43/20 |
| | | | | 370/252 |
| 2016/0248587 | A1 * | 8/2016 | Westberg ............ | G06F 12/0802 |
| 2017/0265127 | A1 * | 9/2017 | Kim ......................... | H04L 43/16 |
| 2017/0302554 | A1 * | 10/2017 | Chandrasekaran ......................... | |
| | | | | H04L 43/0811 |
| 2020/0145308 | A1 * | 5/2020 | Al Ramady ........ | H04L 41/0631 |

* cited by examiner

*Primary Examiner* — Glenton B Burgess
*Assistant Examiner* — Patrick F Ngankam
(74) *Attorney, Agent, or Firm* — Myers Bigel, P.A.

(57) ABSTRACT

Methods, systems, and devices for performing analytics on communications networks. For example, methods may include receiving, at an access point of a wireless network, a first transfer unit comprising first data destined for a first destination; receiving, at the access point, a second transfer unit comprising second data destined for a second destination; grouping, by the access point, the first and second transfer units into a group; and calculating, by the access point and based on the transfer units of the group, a response time associated with the first destination based on a time difference between the receiving of the first transfer unit and the receiving of the second transfer unit. The transfer units may comprise encrypted data.

20 Claims, 9 Drawing Sheets

OBTAIN SAMPLES OF METRIC DATA
REPORTED BY ACCESS POINTS
610

SCORE SAMPLES USING MODEL
620

AGGREGATE SCORES BY
APPLICATION FLOW
630

PERFORM ACTION BASED ON
AGGREGATED SCORES
640

610

MODEL
TRAINING NEEDED?
621

Y

TRAIN
TRANSFORMATION
MODEL
622

N

OBTAIN TRANSFORMATION MODEL
AND PARAMETERS
623

TRANSFORM SAMPLES
INTO SCORES
624

630

RECEIVE TRANSFER UNITS AND DETERMINE LATENCY VALUES
1111

REPORT LATENCY VALUES
1122

RECEIVE TRANSFER UNITS AND DETERMINE LATENCY VALUES
1111

CLUSTER LATENCY VALUES AND AVERAGE CLUSTERS
1112

AGGREGATE/MERGE CLUSTER AVERAGES
1113

REPORT AGGREGATED/MERGED AVERAGE
1121

METHODS, SYSTEMS, AND DEVICES FOR ANALYZING NETWORK PERFORMANCE

CROSS-REFERENCE TO RELATED APPLICATION

The present application claims the benefit of priority to U.S. Provisional Application No. 63/273,288, filed on Oct. 29, 2021, and the entire contents of the above-identified application are incorporated by reference as if set forth herein.

TECHNICAL FIELD

The present disclosure relates to networking systems, and in particular relates to methods, systems, and devices for analyzing network performance.

BACKGROUND

Networking systems are of increasing importance in communications, commerce, entertainment, and other fields. Many electronic devices are now capable of communicating with other electronic devices. Some of this communication can occur over a wireless network. For example, electronic devices can include a networking subsystem that implements a network interface for a wireless local area network (WLAN). A WLAN operates in a limited area (e.g., within a home, school, store, campus, shopping mall, etc.) that interconnects two or more electronic devices using wireless radio frequency ("RF") communications. Electronic devices belonging to users of a WLAN, such as smartphones, computers, tablets, printers, appliances, televisions, lab equipment and the like (herein "client devices"), can communicate with each other and with devices on other networks via the WLAN. Since wireless communications are used, the client devices can move throughout the area covered by the WLAN (e.g., as the users of the client devices move) and remain connected to the network. Most WLANs operate under a family of standards promulgated by the Institute of Electrical and Electronics Engineers ("IEEE") that are referred to as the IEEE 802.11 standards. WLANs operating under the IEEE 802.11 family of standards are commonly referred to as WiFi networks. Client devices that include a networking subsystem that includes a WiFi network interface can communicate over WiFi networks.

A WiFi network includes one or more access points (also referred to as hotspots) that are typically installed at fixed locations throughout the area covered by the WiFi network. The WiFi network can include a single access point that provides coverage in a very limited area or may include tens, hundreds or even thousands of access points that provide in-building and/or outdoor coverage to a large campus or region. Client devices communicate with each other and/or with wired devices that are connected to the WiFi network through the access points. The access points may be connected to each other and/or to one or more controllers through wired and/or wireless connections. The WiFi network typically includes one or more gateways that may be used to provide Internet access to the client devices. Currently, WiFi networks primarily use the 2.4 GHz and/or the 5 GHz frequency bands for the wireless communications.

It is increasingly important to administrators and operators of networks, including WLANs, that the network under their operation and control have performance characteristics that are acceptable to the clients and users of the network. There are a number of performance characteristics that are of interest, such as bandwidth (a maximum amount or maximum capacity of information that can be transferred per second), throughput (an actual quantity of information delivered in a unit of time), speed (the transfer rate of information from a remote source to the client or UE), and latency (delay resulting from the traversal of the information through a network or networks). Network administrators and operators are increasingly interested in monitoring and analyzing the performance of networking systems in near-real time, so that adverse events that may result in degraded performance for clients and users may be resolved more quickly.

SUMMARY

Some aspects of the present disclosure provide methods, devices, and systems that are used for analyzing networking performance. For example, some methods according to the present disclosure may include receiving, at an access point of a wireless network, a first transfer unit comprising first data destined for a first destination; receiving, at the access point, a second transfer unit comprising second data destined for a second destination; grouping, by the access point, the first and second transfer units into a group; and calculating, by the access point and based on the first and second transfer units of the group, a response time associated with the first destination based on a time difference between the receiving of the first transfer unit and the receiving of the second transfer unit. In some embodiments, the first transfer unit and the second transfer unit may each include Hyper-Text Transfer Protocol Secure (HTTPS) formatted data.

Some methods provided herein may include receiving, by an access point of a wireless network, a first transfer unit comprising encrypted first data destined for a first destination; associating a first timestamp corresponding to the first transfer unit to a first indexing identifier; receiving, at the access point, a second transfer unit comprising encrypted second data destined for a second destination; associating a second timestamp corresponding to the second transfer unit to the first indexing identifier; and calculating a response time of a portion of a communication network based on a difference between the first timestamp and the second timestamp.

Some methods provided herein may include receiving, by an access point of a wireless network, a first plurality of upstream transfer units comprising encrypted first data destined for a first destination; associating a first timestamp corresponding to the earliest received of the plurality of upstream transfer units to a first indexing identifier; receiving, at the access point, a second plurality of downstream transfer units comprising encrypted second data destined for a second destination; associating a second timestamp corresponding to the last received of the plurality of downstream transfer unit to the first indexing identifier; and calculating a response time of a portion of a communication network based on a difference between the first timestamp and the second timestamp.

Some methods provided herein provided may include obtaining a set of samples of metric data reported by one or more access points, wherein the samples are within an indefinite value range; scoring the samples using a transformation model, resulting in scores that are within a definite value range; aggregating the scores; and performing at least one action based on the aggregated scores.

Some methods provided herein may include receiving, at an access point of a wireless network, a first transfer unit comprising first data destined for a first destination; receiving, at the access point, a second transfer unit comprising second data destined for a second destination; grouping, by the access point, the first and second transfer units into a group; and calculating, by the access point and based on the first and second transfer units of the group, a first latency associated with the first destination based on a time difference between the receiving of the first transfer unit and the receiving of the second transfer unit.

Some methods provided herein may include obtaining a set of samples of metric data reported by one or more access points, wherein the samples are within an indefinite value range; scoring the samples using a transformation model, resulting in scores that are within a definite value range; aggregating the scores; and clustering the scores into at least two groups, each group having a standard deviation of the scores within the group that is below a predetermined threshold.

Other embodiments of the present disclosure may include devices and systems. For example, an access point provided herein may be configured to service client devices via a wireless network. The access point may be configured to: receive a first transfer unit comprising first data destined for a first destination; receive a second transfer unit comprising second data destined for a second destination; group the first and second transfer units into a group; and calculate a response time associated with the first destination based on a time difference between the receiving of the first transfer unit and the receiving of the second transfer unit.

The present disclosure is not limited to the examples of embodiments provided explicitly above, and other embodiments will become apparent to those of skill in the art to which the present disclosure pertains.

4

Figure 10:
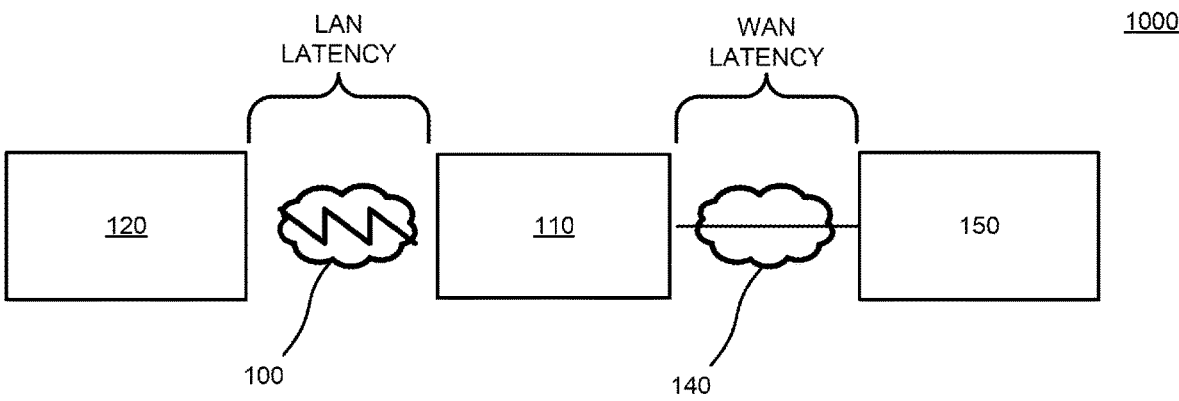

FIG. 10 is a block diagram illustrating aspects of latency according to embodiments of the present disclosure.

Figures 11A, 11B, 12A, 12B:
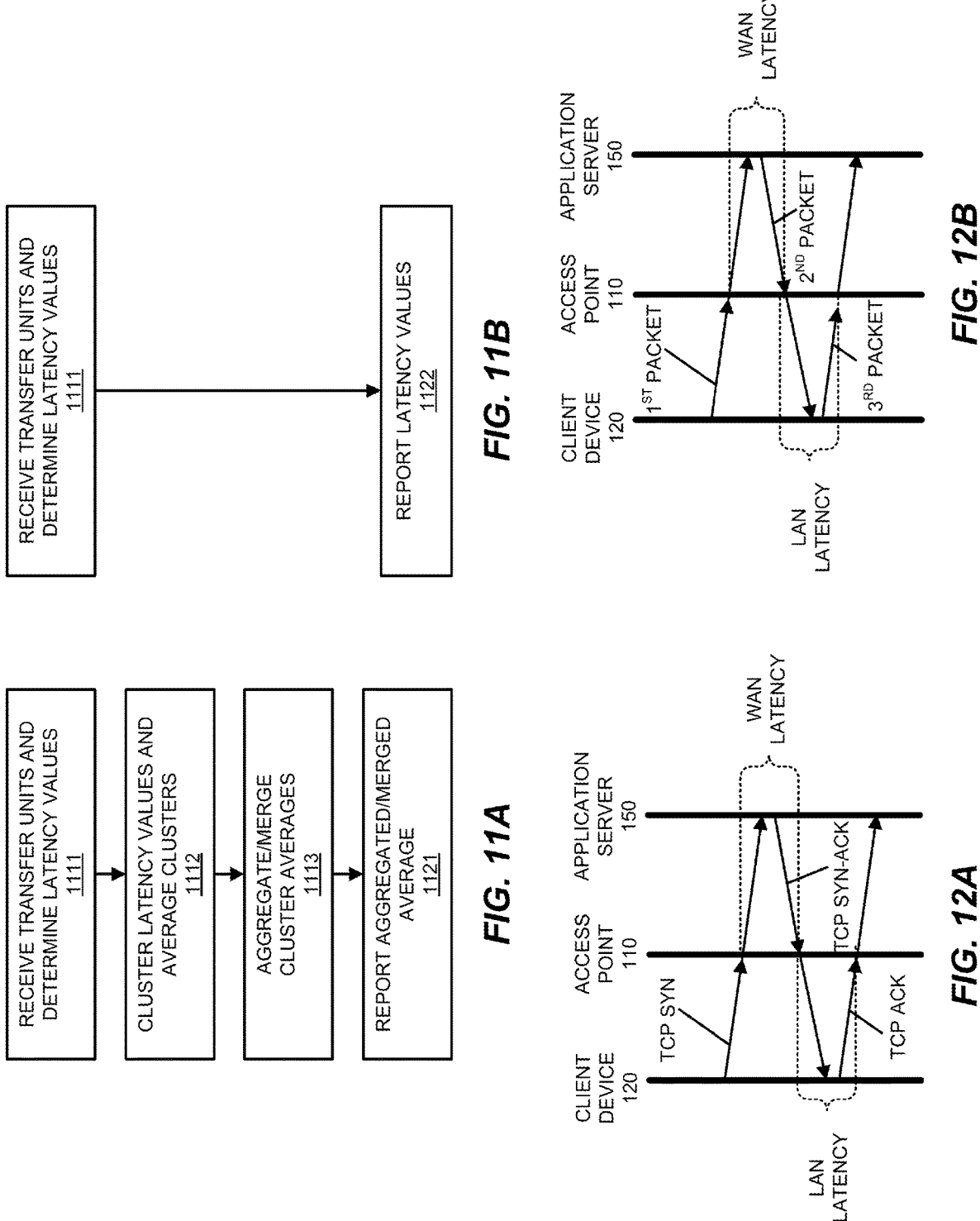

FIGS. 11A and 11B are flow charts illustrating operations of methods for an electronic device to perform analytics in a wireless local area network according to embodiments of the present disclosure.

FIGS. 12A and 12B are schematic drawings illustrating examples of transfer units for communication between a client device and an application server via an access point according to embodiments of the present disclosure.

Figure 13:
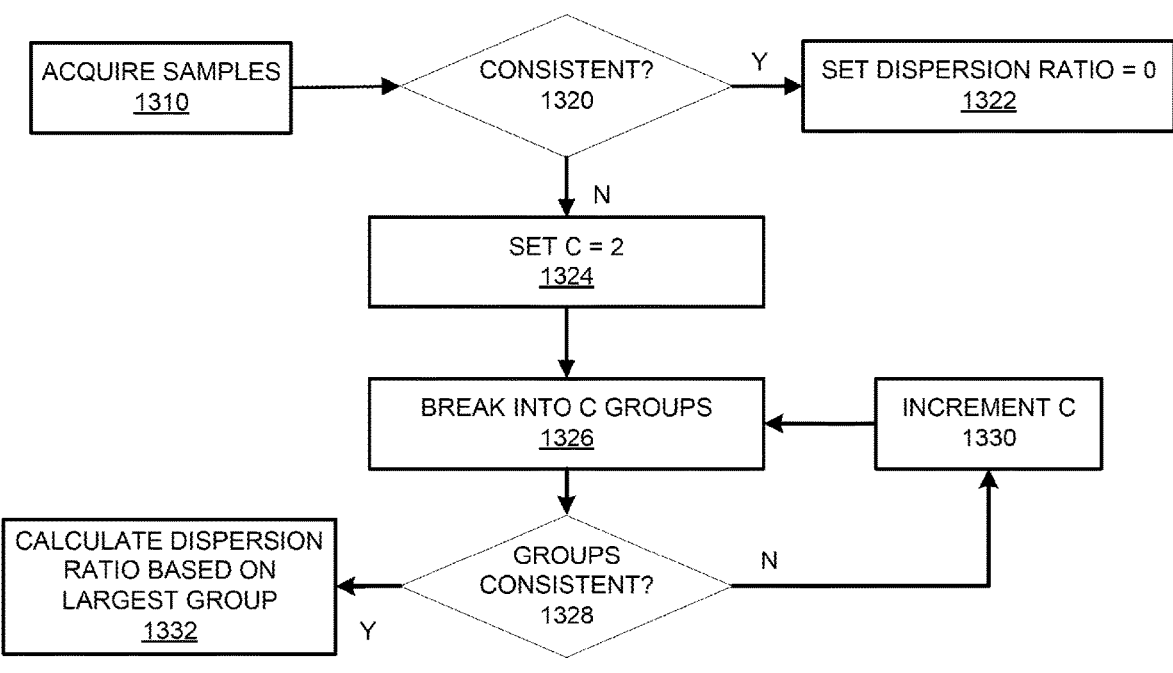

FIG. 13 is a flow chart illustrating operations of methods for an electronic device to perform analytics in a wireless local area network according to embodiments of the present disclosure.

Figure 14:
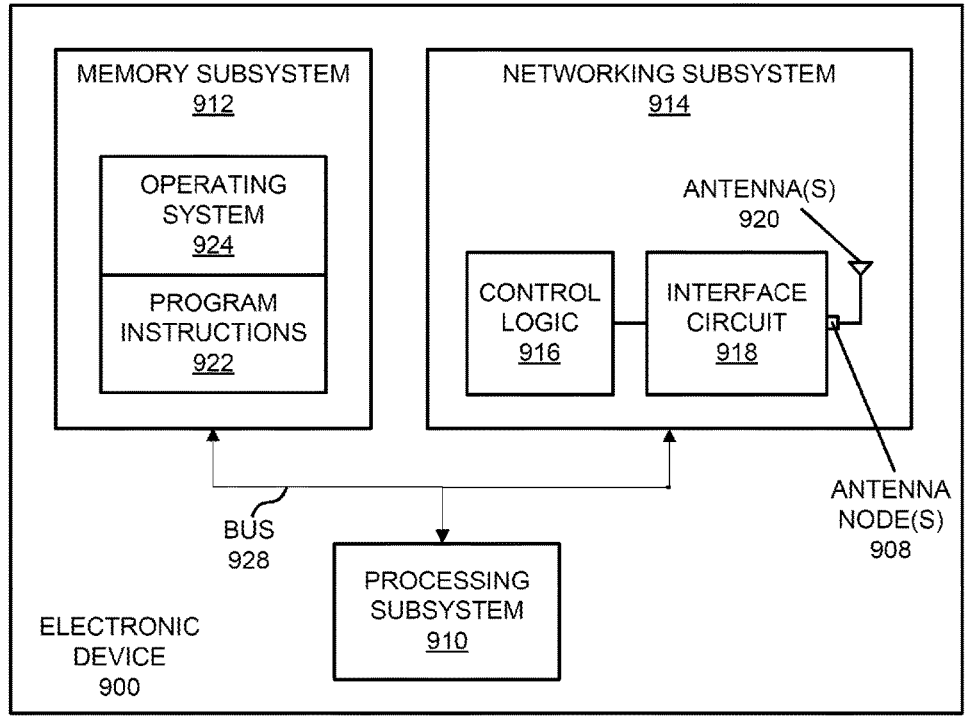

FIG. 14 is a block diagram of an electronic device (e.g., an access point or a client device) according to embodiments of the present disclosure.

Like reference numerals refer to corresponding parts throughout the drawings. Moreover, multiple instances of the same part may be designated by a common prefix separated from an instance number by a dash.

DETAILED DESCRIPTION

One very popular way of using communications networks is to transfer World Wide Web (web) resources that are in the form of hypertext documents. Such resources are typically referred to as HyperText Markup Language (HTML) formatted documents or web pages, and are typically communicated using a HyperText Transfer Protocol (HTTP), though other document formats and protocols may be used.

HTTP is an application layer protocol that operates as a request/response protocol: a client device may request a resource stored at an application server, and the application server may provide a response with the resource (and/or status information about the resource, such as that the resource cannot be found, has moved, is unchanged, or is forbidden to the requesting client device). Once the resource has been successfully received, the client device may present the resource using appropriate software, such as a web browser.

Although a web page may be presented to a user as a single cohesive document, it is often the case that not all of the content is retrieved using a single HTTP request. For example, the HTML-formatted document retrieved from an application server may indicate links to a number of other resources, such as style information (e.g., how the content is to be presented, such as fonts, colors, sizes, or the like), multimedia information (e.g., images, audio, video, or the like), and/or script information (e.g., machine-readable code that can be executed by the client device). These resources may not be located on the same application server as the initial document. Each of these resources is also requested by the originating client device using the HTTP request protocol. A single web page requested by a client device may therefore result in a number of HTTP requests to various application servers located throughout the Internet.

HTTP is an application layer protocol (e.g., layers 5-7 of the Open Systems Interconnect (OSI) model. Identifying the correct application servers, directing the HTTP traffic thereto, and communicating the requests and responses over different communication network is typically performed by encapsulating the HTTP request or HTTP response with lower layer protocol wrappers, such as Transmission Control Protocol (TCP) segments at the transport layer (layer 4), Internet Protocol (IP) packets at the network layer (layer 3), and Ethernet frames at the data link layer (layer 2).

HTTP requests and responses are typically one-to-one correlated: a HTTP request should receive a single HTTP response. However, there is not necessarily a one-to-one correspondence between HTTP requests/responses and the lower layer segments, packets, and frames. A single HTTP request or response may be broken down into multiple TCP segments, IP packets, and/or frames depending on the size of the request or response.

Given the importance and popularity of HTTP data traffic (web traffic), network operators and administrators may desire to perform analysis of web traffic as it crosses their network. One way of performing this analysis can be by calculating a time difference between when a resource is requested (such as a web page) in an HTTP request and when the HTTP response that includes the resource is received. For example, an access point or other network device can receive a first layer 2 Ethernet frame, layer 3 IP packet, and/or layer 4 TCP segment from a client device and look at the HTTP request encapsulated therein for a unique identifier (e.g., a uniform resource identifier (URI) or locator (URL)) for a requested resource. A subsequent second frame, packet, or segment can also be examined to see when a response that provides the requested resource is received from the application server. The time difference between the first and second frame, packet, or segment can then be calculated. In some situations, the first frame, packet, or segment can be the initial frame, packet, or segment that includes a first part of the HTTP request, and the second frame, packet, or segment can be the final frame, packet, or segment that includes a last part of the HTTP response.

There has been a recent movement to encrypt communications over computer networks for a variety of reasons, such as privacy, integrity of data in transit, and authentication that the client device and/or the application server are legitimate. For HTTP data traffic, the primary encryption mechanism is the HyperText Transfer Protocol Secure (HTTPS) protocol, which is an extension of HTTP that uses a cryptographic protocol, such as Transport Layer Security (TLS) or Secure Sockets Layer (SSL), for encryption. The structure of HTTPS permits the entirety of the HTTP request or response to be encrypted. This includes the URI/URL, as well as other information associated with the request and response, such as query parameters, headers, and identifying information such as cookies. Website addresses and port numbers cannot be encrypted by HTTPS, because the information is needed for the layer 2, 3, and 4 protocols to communicate the requests and responses through the Internet.

The increasing usage of HTTPS results in difficulty in understanding the performance of a network using the technique discussed above, as HTTP requests for a resource and HTTP responses providing the resource can no longer be directly correlated. As a result, HTTP response times calculated as above either cannot be calculated and reported, or are inaccurate (because a HTTP request is correlated with a disassociated HTTP response).

Accordingly, aspects of the present disclosure provide methods, systems, and devices that are configured to record, analyze, and report one or more metrics associated with network traffic. In some embodiments, the reported metrics include a total time taken for communicating a web page or part of the web page from an application server to an access point that is servicing a client device. Data may be collected by the access point, and may be represented on the access point by a hash indexed mechanism. The access point may pair outgoing transfer units (e.g., packets, frames, segments) with incoming transfer units using one or more identifiers, such as source address, destination address, source port, destination port, and protocol (e.g., TCP, HTTP, HTTPS).

Also provided are methods, systems, and devices that are configured to perform calculations on recorded metric data as part of a data analysis process. For example, network conditions may result in highly variable metrics over a given period of time. As a result, a simple averaging of samples may not be representative of the performance of the network. The samples may therefore be clustered, and averages may be taken of each cluster. The resultant averages may be merged or aggregated, with the resultant aggregation more representative of the sample set.

In some embodiments, the one or more metrics associated with the network traffic that are recorded, analyzed, and reported may include one or more quality of experience (QoE) metrics. An example of a QoE metric may be page download time (PDT). The present disclosure provides methods, systems, and techniques for mapping QoE metrics in an indefinite value range to normalized QoE scores in a definite value range using, as an example, unsupervised machine learning. As one example, a parametric method based on a modified sigmoid function may be used. The normalized QoE scores may be aggregated for reporting on a per-client basis, per-application server basis, per-application flow basis, and/or on the basis of another criterion. The aggregated data may be reported, and/or another action may be performed. Herein, page download time is provided as an extended example of a QoE metric that may be recorded, analyzed, and/or reported according to the present disclosure, with the understanding that the present disclosure is not limited thereto.

Figure 1:
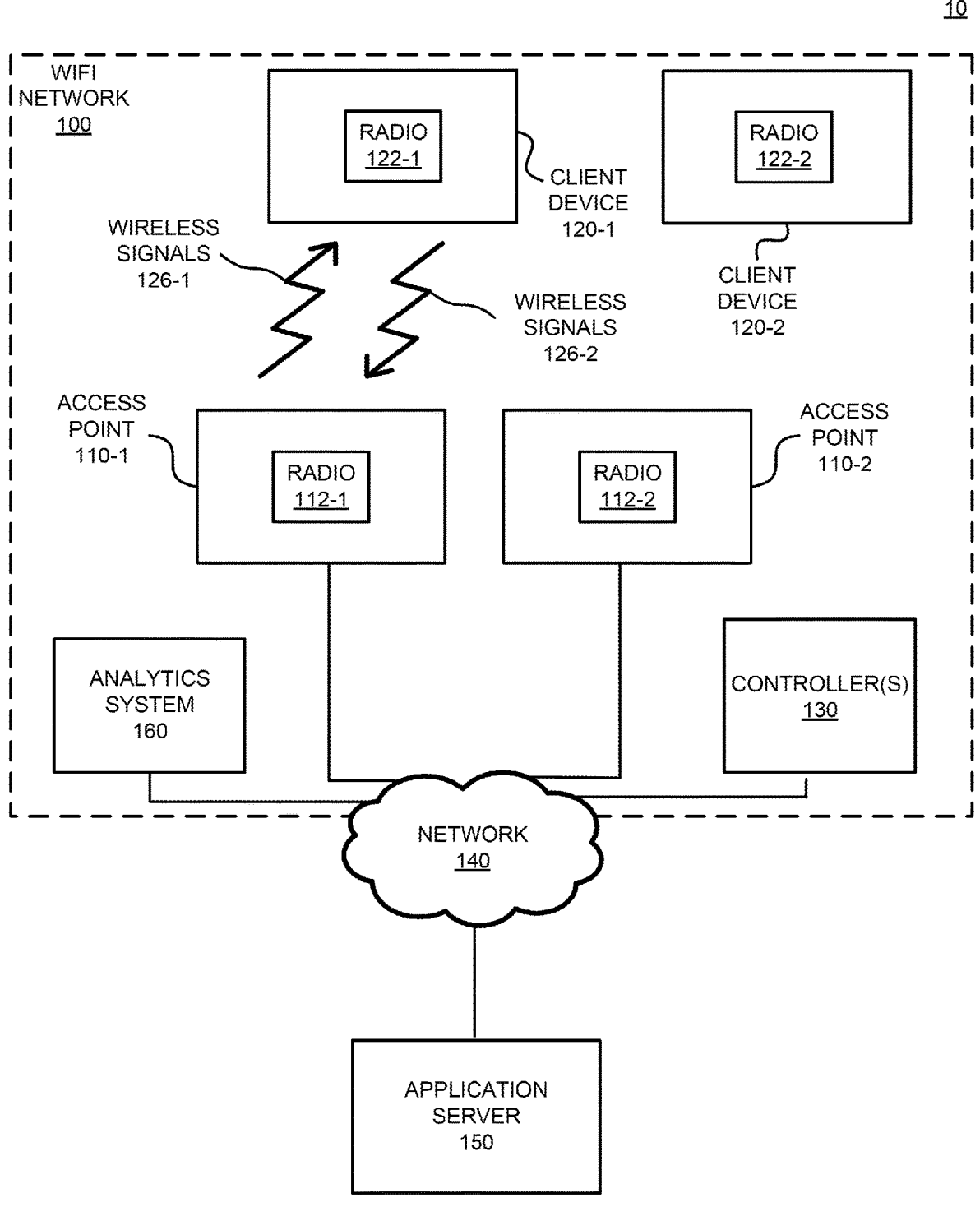
FIG. 1 is a block diagram illustrating an example of a system according to embodiments of the present disclosure.

FIG. 1 is a block diagram illustrating a very simple, example system 10 including a WiFi network 100 in which the analytics techniques according to embodiments of the present inventive concepts may be practiced. As shown in FIG. 1, the WiFi network 100 may include one or more access points 110, one or more client devices 120 (such as cellular telephones, computers, tablets, printers and a wide range of other WiFi-capable electronic devices), one or more optional controllers 130, and an analytics system 160. The access points 110 may communicate with one or more of the client devices 120 using wireless communication that is compatible with an IEEE 802.11 standard. Thus, the wireless communication may occur in, for example, the 2.4 GHz frequency band, the 5 GHz frequency band and/or the 60 GHz frequency band. However, other frequency bands may be used, and it will be appreciated that future versions of the IEEE 802.11 standards may operate in additional or different frequency bands, such as, for example, the 6 GHz frequency band. While not shown in FIG. 1, the WiFi network 100 may include additional components or electronic devices, such as, for example, a router.

The access points 110 and the client devices 120 may communicate with each other via wireless communication. The access points 110 and the client devices 120 may wirelessly communicate by: transmitting advertising frames on wireless channels, detecting one another by scanning wireless channels, exchanging subsequent data/management frames (such as association requests and responses) to establish a connection and configure security options (e.g., Internet Protocol Security), transmit and receive frames or packets via the connection, etc.

As described further below with reference to FIG. 14, the access points 110, client devices 120, and/or the controllers 130 may include subsystems, such as a networking subsystem, a memory subsystem and a processor subsystem. The networking subsystems may include radios that are used to wirelessly communicate with each other. For example, the access points 110 may include at least one radio 112 that is configured to transmit and receive signals in a frequency band. In some embodiments, the at least one radio 112 may include a first radio configured to transmit and receive signals in a frequency band (e.g., the 2.4 GHz frequency band), and a second radio that is configured to transmit and receive signals in a second frequency band (e.g., the 5 GHz frequency band). Similarly, the client devices likewise may include at least one radio 122, and in some embodiments may include a first radio that is configured to transmit and receive signals in the first frequency band (e.g., the 2.4 GHz frequency band), and a second radio that is configured to transmit and receive signals in the second frequency band (e.g., the 5 GHz frequency band).

As can be seen in FIG. 1, wireless signals 126-1 (represented by a jagged line) are transmitted from the access point 110-1 (and the at least one radio 112 thereof) to client device 120-1. These wireless signals are received by the at least one radio 122 in the client device 120-1. Likewise, wireless signals 126-2 (represented by a jagged line) are transmitted from the client device 120-1 (and the at least one radio 122 thereof), and may be received by the at least radio 112 of the access point 110-1. The wireless signals 126-1, 126-2 may comprise frames or packets that are transmitted between the client device 120-1 and the access point 110-1.

The communication between client device 120-1 and access point 110-1 may be characterized by a variety of performance metrics, including, for example, a data rate, throughput (i.e., the data rate for successful transmissions), an error rate (such as a retry or resend rate), a signal-to-noise ratio, a ratio of number of bytes successfully communicated during a time interval to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

The access points 110 may also communicate with the one or more optional controllers 130 via a network 140 (discussed below) and/or one or more dedicated communication links (not shown). It will also be appreciated that some access points 110 may only be connected to the network 140 through other access points 110 (e.g., in a mesh network implementation). Note that the optional controllers 130 may be at the same location as the other components in WiFi network 100 or may be located remotely (e.g., cloud-based controllers 130). The access points 110 may be managed and/or configured by the one or more optional controllers 130. The access points 110 may communicate with the controller(s) 130 or other services using wireless communications and/or using a wired communication protocol, such as a wired communication protocol that is compatible with an IEEE 802.3 standard (which is sometimes referred to as 'Ethernet'), e.g., an Ethernet II standard. The access points 110 may be physical access points or may be virtual or 'software' access points that are implemented on a computer or other electronic device.

The access points 110 may provide the client devices 120 access to one or more networks 140, which may be a local area network (LAN), campus area network (CAN), wide area network (WAN), metropolitan area network (MAN), and/or the Internet. For example, the access points 110 may provide (via the one or more networks 140) a communication path between the client device 120 and an application server 150 and content can be bidirectionally transmitted therebetween.

As with the communication between client device 120-1 and access point 110-1, the communication between the access point 110-1 and the application server 150 (via the one or more networks 140) may be characterized by a variety of performance metrics, including, for example, data rate, throughput, latency, capacity, utilization, and bandwidth.

The performance metrics of the WiFi network 100 (including the communication between client device 120-1 and access point 110-1 and/or the performance metrics of the at least one network 140 (including the communication between the access point 110-1 and the application server 150) may be recorded and/or analyzed, for example by the analytics system 160. The analytics system 160 may be at the same location as the other components in WiFi network 100 or may be located remotely (e.g., a cloud-based analytics system 160). In some embodiments, the analytics system 160 may be partially or completely integrated the one or more controllers 130.

The analytics system 160 may include a computing device configured to execute an analytical model, such as a machine-learning model or a neural network. In some embodiments, the analytical model may be configured to perform unsupervised learning, as discussed in greater detail herein. The present disclosure is not limited thereto, however, and in some embodiments, the analytical model may include a classifier or a regression model that was trained using: a support vector machine technique, a classification and regression tree technique, logistic regression, LASSO, linear regression, a neural network technique (such as a convolutional neural network technique, a generative adversarial network or another type of neural network technique) and/or another linear or nonlinear supervised-learning technique.

Figure 2:
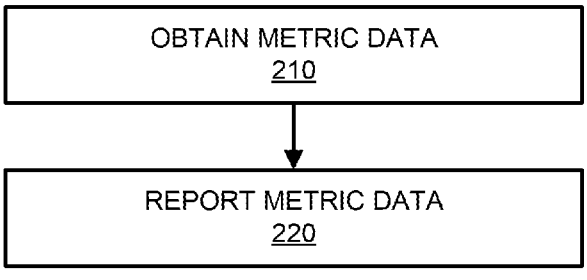
FIG. 2 is a flow chart illustrating a method for an electronic device to perform analytics in a wireless local area network according to embodiments of the present disclosure.

The access points 110 (and, in some embodiments, other electronic devices of the WiFi network 100) may communicate with the analytics system 160 and provide to the analytics system 160 data associated with one or more metrics that are to be analyzed. This data may be analyzed in substantially real time (e.g., at or near to the time at which the data is received by the analytics system 160), and/or the data may be analyzed at a period of time subsequent to when the data is received by the analytics system 160. FIG. 2 is a flow chart illustrating a method for an electronic device to provide data associated with one or more metrics in a wireless local area network according to embodiments of the present disclosure. Herein, the electronic device may be an access point 110, with the understanding that the present disclosure is not limited thereto. During operation, the access point 110 may obtain information related to one or more metrics (operation 210), and report the obtained information related to the one or more metrics (operation 220).

As a more particular example, the one or more metrics associated with the network traffic that are recorded, analyzed, and reported by the access point 110 and/or the analytics system 160 may include one or more quality of experience (QoE) metrics. As discussed above, one example of a QoE metric may be page download time (PDT). The access point 110 may obtain a total time taken for communicating a web page or part of the web page from an application server (e.g., the application server 150) to the access point 110 that is providing network access to a client device 120.

Figure 3A:
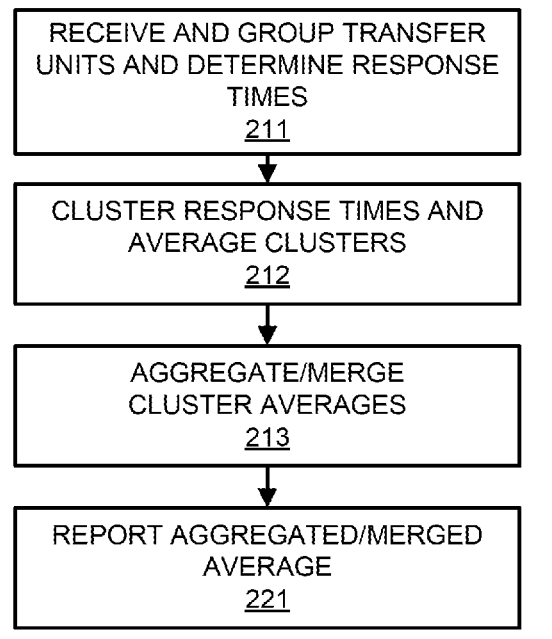
FIGS. 3A and 3B are flow charts illustrating operations of methods for an electronic device to perform analytics in a wireless local area network according to embodiments of the present disclosure.
Figure 3B:
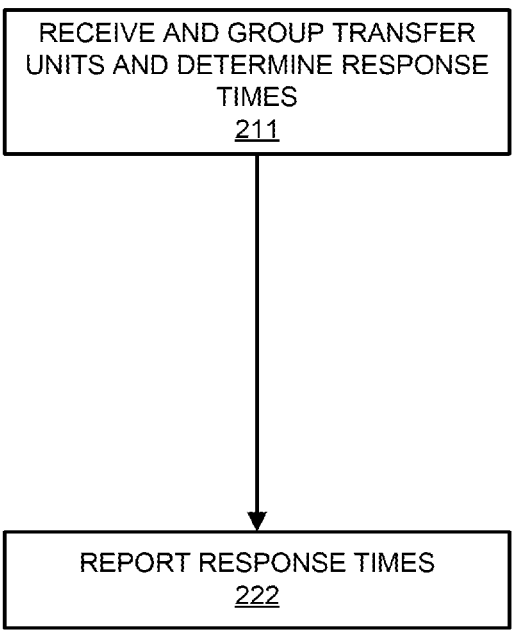

FIGS. 3A and 3B are flow charts illustrating operations of methods for an electronic device to perform analytics in a wireless local area network according to embodiments of the present disclosure. FIGS. 3A and 3B elaborate on FIG. 2 and provide greater detail in the example of obtaining and reporting QoE metric data associated with page download time. In the operations of FIG. 3A and FIG. 3B, the access points 110 (and, in some embodiments, other electronic devices of the WiFi network 100) may receive transfer units (such as packets, frames, segments, or the like) from the client device 120 and from the application server 150 and determine response times of the application server 150 (operation 211).

Figure 4:
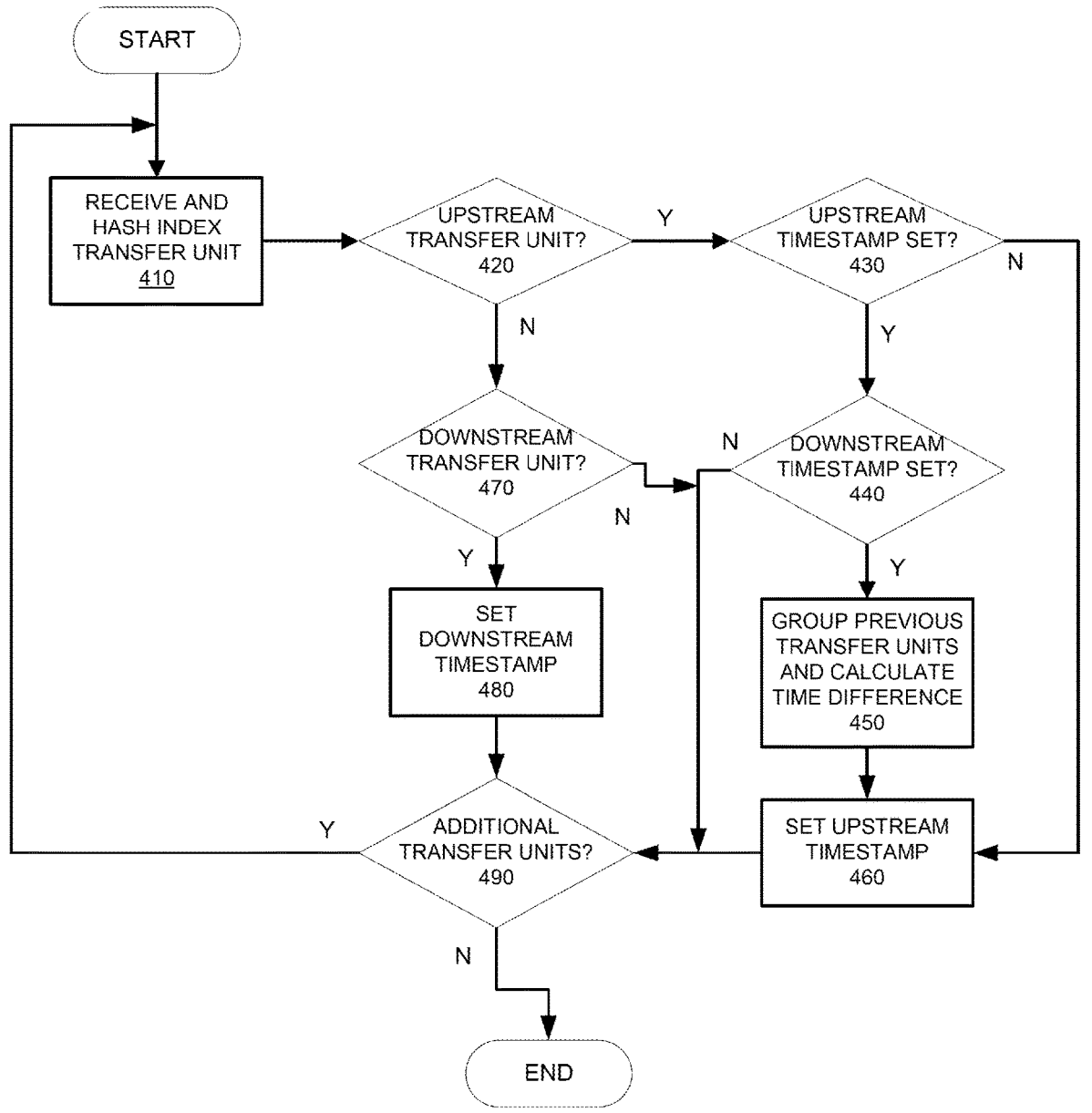
FIG. 4 is a flow chart illustrating operations of methods for an electronic device to group request and response packets in a wireless local area network according to embodiments of the present disclosure.

In greater detail, FIG. 4 is a flow chart illustrating operations of methods for an electronic device, such as access point 110, to group transfer units, such as TCP segments or IP packets, in a wireless local area network according to embodiments of the present disclosure. As discussed above, in HTTP and HTTPS, a client (e.g., client device 120) establishes a connection to a remote server (e.g., application server 150 of FIG. 1) and requests a resource, such as a HTML document, an image file, an audio file, a movie file, or other content by issuing a HTTP request. The HTTP request and/or the HTTP response may result in one or more transfer units at lower protocol levels (e.g., TCP, IP, Ethernet, or the like). For clarity, transfer units destined for an application server 150 will be referred to as upstream transfer units, and transfer units destined for a client device 120 will be referred to as downstream transfer units.

Methods of grouping transfer units may include receiving the transfer unit and performing an indexing operation thereon (operation 410). For example, the indexing operation may include retrieving one or more identifiers from the transfer unit, such as source address, destination address, source port, destination port, and protocol (e.g., TCP, HTTP, HTTPS). In some embodiments, the protocol may be a higher-layer protocol. The higher-layer protocol may be identified using a protocol version number present in data (including encrypted data). For example, HTTPS application data packets may be recognized via examination of three bytes of data within the header thereof (either {0x17, 0x03, 0x02} or {0x17, 0x03, 0x03}, depending on the specific version of TLS used for encryption). As a result of the indexing operation, an indexing identifier for the transfer unit may be added to a data store (e.g., a hash).

The access point 110 may detect whether the transfer unit is an upstream transfer unit (e.g., the transfer unit is received from the client device 120 and destined for an application server 150) (operation 420). This may include, for example, identifying the source address and/or destination address of the transfer unit, and/or by examining other data within the transfer unit.

If the transfer unit is an upstream transfer unit ("Y" branch from operation 420), then the access point 110 may determine whether an upstream timestamp has been set for the indexing identifier (operation 430). If no upstream timestamp has been set (for example, because this is an initial upstream transfer unit or because previous upstream transfer units have been grouped), then a timestamp of the time of receipt of the transfer unit is stored in the data store as associated with the indexing identifier (operation 460).

If the transfer unit is not an upstream transfer unit ("N" branch from operation 420), then the access point 110 may determine whether the transfer unit is a downstream transfer unit (e.g., the transfer unit is received from an application server 150 and destined for a client device 120) (operation 470). If the transfer unit is a downstream transfer unit ("Y" branch from operation 470), then a downstream timestamp is set for the indexing identifier (operation 480). A timestamp of the time of receipt of the transfer unit is stored in the data store as associated with the indexing identifier. This may overwrite a previously stored downstream timestamp, as will be explained further with reference to FIGS. 5A-D.

In some embodiments, some transfer units may not be either upstream or downstream transfer units ("N" branch from operation 470). Stated differently, not all transfer units may be indexed and/or grouped (e.g., in some embodiments, operation 410 may be conditional). For example, transfer units may be control transfer units, acknowledgement transfer units, or transfer units associated with protocols that are not of interest to a network operator or administrator.

Returning to operation 430, if the upstream timestamp associated with an indexing identifier has been previously set ("Y" branch from operation 430), then the access point 110 may determine wither the downstream timestamp associated with the indexing identifier has also been set (operation 440). If the access point 110 determines that the downstream timestamp has not been set ("N" branch from operation 440), then the access point may await additional transfer units (operation 490). If, however, the access point 110 determines that both a downstream timestamp and an upstream timestamp have been set for an indexing identifier, then two or more transfer units may be grouped (operation 450).

Figure 5B:
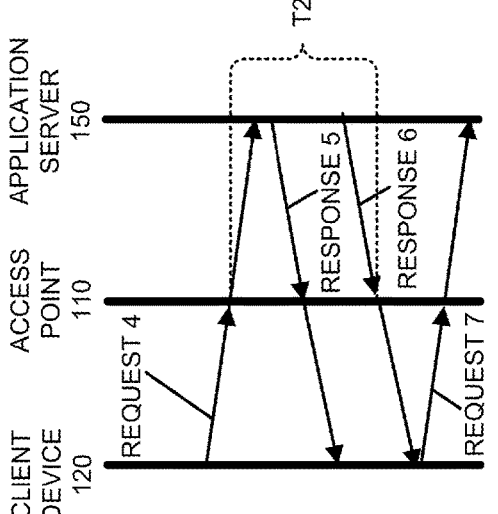
FIGS. 5A-D are schematic drawings illustrating examples of transfer unit request and response groups for communication between a client device and an application server via an access point according to embodiments of the present disclosure.
Figure 5D:
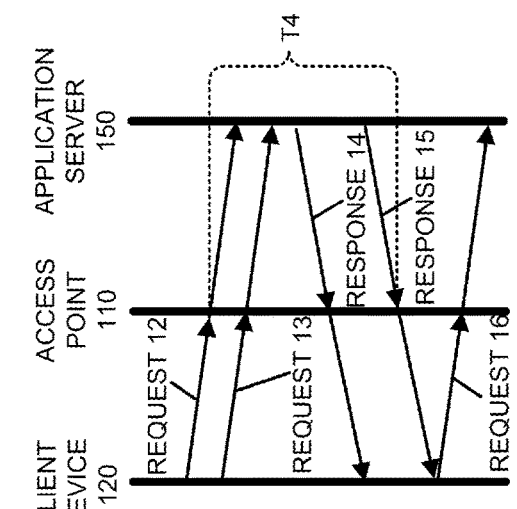
Figure 5A:
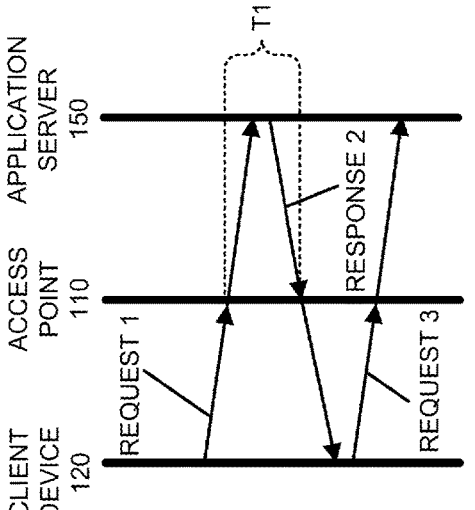

Reference is now made to FIG. 4 in combination with FIGS. 5A-D, which are schematic drawings illustrating examples of transfer unit request and response groups between a client device and an application server via an access point. As can be seen in FIG. 5A, in some situations, a single upstream transfer unit (Request 1 traversing from client device 120 to application server 150) may be grouped with a single downstream transfer unit (Response 2 traversing from application server 150 to client device 120). Assuming no previous transfer units in this explanatory example, the upstream transfer unit Request 1 may be received at access point 110 and indexed to associate the upstream transfer unit Request 1 with an indexing identifier (operations 410 and 420 of FIG. 4). The upstream timestamp associated with the indexing identifier has not been previously set (operation 430), and as such the upstream timestamp is set (operation 460). Then ("Y" branch from operation 490), the downstream transfer unit Response 2 is received, and also indexed to associate the downstream transfer unit Response 2 with the indexing identifier (operations 410, 420, 470). The downstream timestamp is set to the time when the downstream transfer unit is received by the access point 110 (operation 480).

Subsequently ("Y" branch from operation 490), the upstream transfer unit Request 3 is received, and also indexed to associate the upstream transfer unit Request 3 with the indexing identifier (operations 410, 420). Because the upstream timestamp has been set ("Y" branch from operation 430) and the downstream timestamp has been set ("Y" branch from operation 440), then Request 1 and Response 2 form a group (operation 450), and a difference is calculated between to upstream timestamp and the downstream timestamp. This calculated time difference is stored in or added to an accumulator (e.g., within the data store). The upstream transfer unit Request 3 represents a transfer unit of a second group, and as such the upstream timestamp is set to the time the upstream transfer unit Request 3 is received by the access point 110.

As can be seen in FIG. 5B, some situations may be more complex, and a single upstream transfer unit (Request 4 traversing from client device 120 to application server 150) may be grouped with a multiple downstream transfer units (Response 5 and Response 6 traversing from application server 150 to client device 120). Such a situation may arise where the response is large and split across multiple transfer units. Assuming no previous transfer units in this explanatory example, the upstream transfer unit Request 4 may be received and processed in a manner similar to the upstream transfer unit Request 1 of FIG. 5A. Then ("Y" branch from operation 490), the downstream transfer unit Response 5 is received and also indexed to associate the downstream transfer unit Response 5 with the indexing identifier (operations 410, 420, 470). The downstream timestamp is set to the time when the downstream transfer unit Response 5 is received by the access point 110 (operation 480). Subsequently ("Y" branch from operation 490), the downstream transfer unit Response 6 is received and also indexed to associate the downstream transfer unit Response 6 with the indexing identifier (operations 410, 420, 470). The downstream timestamp is updated to the time when the downstream transfer unit Response 6 is received by the access point 110 (operation 480).

Later ("Y" branch from operation 490), the upstream transfer unit Request 7 is received, and also indexed to associate the upstream transfer unit Request 7 with the indexing identifier (operations 410, 420). Because the upstream timestamp has been set ("Y" branch from operation 430) and the downstream timestamp has been set ("Y" branch from operation 440), then Request 4, Response 5, and Response 6 form a group (operation 450), and a difference is calculated between the upstream timestamp and the latest downstream timestamp (i.e., that of the last downstream transfer unit Response 6). This calculated time difference is stored in or added to an accumulator (e.g., within the data store). The upstream transfer unit Request 7 represents a transfer unit of a second group, and as such the upstream timestamp is set to the time the upstream transfer unit Request 7 is received by the access point 110.

Figure 5C:
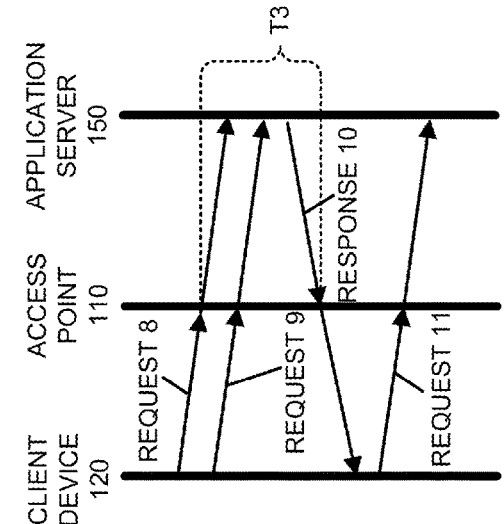

Another more complex situation is represented in FIG. 5C, where multiple upstream transfer units (Request 8 and Request 9 traversing from client device 120 to application server 150) may be grouped with a single downstream transfer unit (Response 10 traversing from application server 150 to client device 120). Such a situation may arise where the request is large and split across multiple transfer units. Assuming no previous transfer units in this explanatory example, the upstream transfer unit Request 8 may be received and processed in a manner similar to the upstream transfer unit Request 1 of FIG. 5A. Then ("Y" branch from operation 490), the upstream transfer unit Request 9 is received and also indexed to associate the upstream transfer unit Request 9 with the indexing identifier (operations 410, 420, 430). However, because the upstream timestamp has already been set ("Y" branch from operation 430) but the downstream timestamp has not been set ("N" branch from operation 440), the upstream transfer unit Request 9 does not represent a new group, and as such no action is taken.

The downstream transfer unit Response 10 is received and also indexed to associate the downstream transfer unit Response 10 with the indexing identifier (operations 410, 420, 470). The downstream timestamp is set to the time when the downstream transfer unit Response 10 is received by the access point 110 (operation 480).

Later ("Y" branch from operation 490), the upstream transfer unit Request 11 is received and also indexed to associate the upstream transfer unit Request 11 with the indexing identifier (operations 410, 420). Because the upstream timestamp has been set ("Y" branch from operation 430) and the downstream timestamp has been set ("Y" branch from operation 440), then Request 8, Request 9, and Response 10 form a group (operation 450), and a difference is calculated between the earlier upstream timestamp (i.e., that of the first upstream transfer unit Request 8) and the downstream timestamp (i.e., that of the downstream transfer unit Response 10). This calculated time difference is stored in or added to an accumulator (e.g., within the data store). The upstream transfer unit Request 11 represents a transfer unit of a second group, and as such the upstream timestamp is set to the time the upstream transfer unit Request 11 is received by the access point 110.

Yet another more complex situation is represented in FIG. 5D, where multiple upstream transfer units (Request 12 and Request 13 traversing from client device 120 to application server 150) may be grouped with a multiple downstream transfer units (Response 14 and Response 15 traversing from application server 150 to client device 120). Such a situation may arise where both the request and the response are large and split across multiple transfer units. Assuming no previous transfer units in this explanatory example, the upstream transfer units Request 12 and Request 13 may be received and processed in a manner similar to the upstream transfer units Request 8 and Request 9 of FIG. 5C. When upstream transfer unit Request 13 is processed, the upstream timestamp has already been set ("Y" branch from operation 430) but the downstream timestamp has not been set ("N" branch from operation 440). As such, the upstream transfer unit Request 13 does not represent a new group, and as such no action is taken.

The downstream transfer unit Response 14 is received and also indexed to associate the downstream transfer unit Response 14 with the indexing identifier (operations 410, 420, 470). The downstream timestamp is set to the time when the downstream transfer unit Response 14 is received by the access point 110 (operation 480). Subsequently ("Y" branch from operation 490), the downstream transfer unit Response 15 is received and also indexed to associate the upstream transfer unit Response 15 with the indexing identifier (operations 410, 420, 470). The downstream timestamp is updated to the time when the downstream transfer unit Response 15 is received by the access point 110 (operation 480).

Later ("Y" branch from operation 490), the upstream transfer unit Request 16 is received, and also indexed to associate the upstream transfer unit Request 16 with the indexing identifier (operations 410, 420). Because the upstream timestamp has been set ("Y" branch from operation 430) and the downstream timestamp has been set ("Y" branch from operation 440), then Request 12, Request 13, Response 14, and Response 15 form a group (operation 450), and a difference is calculated between the earliest upstream timestamp (i.e., that of the first upstream transfer unit Request 12) and the latest downstream timestamp (i.e., that of the last downstream transfer unit Response 15). This calculated time difference is stored in or added to an accumulator (e.g., within the data store). The upstream transfer unit Request 16 represents a transfer unit of a second group, and as such the upstream timestamp is set to the time the upstream transfer unit Request 16 is received by the access point 110.

In summary of the above, a group may include two or more transfer units, and more specifically both one or more upstream transfer units and one or more downstream transfer units. Transfer units may be grouped together in a lookback manner; a group is formed when an upstream transfer unit is received after a downstream transfer unit. After the group is formed, a difference is calculated between the earliest upstream timestamp of the group (i.e., that of the first upstream transfer unit) and the latest downstream timestamp (i.e., that of the last downstream transfer unit). This calculated time difference is stored in or added to an accumulator. The accumulator aggregates multiple calculated time differences, and as such upon completion of the transfer of data from the application server 150 to the client device 120 (via the access point 110), the value of the accumulator represents the total time to transfer the data for all or part of a web page, or the response time of the application server 150.

In some embodiments, multiple concurrent streams of data may be transmitted between the devices. The accumulator may aggregate the calculated time differences for one or more of the multiple streams of data.

In some embodiments, once data transfer is complete, no upstream transfer unit associated with the indexing identifier may be received ("N" branch from operation 490). In some embodiments, an additional operation of grouping transfer units may be performed after a timeout counter has elapsed (e.g., no traffic has been received for a period of time exceeding an expected time for traffic).

Returning now to FIGS. 3A and 3B, in some embodiments and as seen in FIG. 3B, response times as determined in FIG. 4 for all or part of a web page may be reported by the access point 110 to the analytics system 160 for further analysis and calculation thereon (operation 222). In some embodiments and as seen in FIG. 3A, after the response times are determined, the access point 110 may cluster the response times and perform averaging or other calculating based on the clusters (operation 212). The averages of the clusters may be then aggregated to provide a more representative metric of the response times (operation 213) prior to the reporting thereof (operation 221).

In greater detail, response times calculated using the operations of FIG. 4 may be indexed per application server 150, or in other words the application server from where the page or part of the page is downloaded. In some embodiments, the access point 110 may identify multiple flows of transfer units that are associated with the same application server 150 (either for the same client device 120 or for different client devices 120 serviced by the access point 110). An average (e.g., arithmetic mean) of the response times of the multiple flows may be a desired reporting metric. However, depending on the network conditions, response times over a given time frame may vary widely. For example, in a period of 5 minutes, five transfers of equal-sized content may be 10 milliseconds (ms), 500 ms, 1000 ms (or 1 second), 20 ms, and 40 ms because of different network conditions. A simple arithmetic mean of these five response times would be (10+500+1000+20+40)/5 or 314 ms. This value is not representative of any of the five response times in the given set. In other words, when the distribution of the samples is large, an arithmetic mean tends to lose specificity.

The response times may be clustered (operation 212). For example, two 'buckets' of samples may be created: a first bucket and a second bucket. Each response time may be examined iteratively and merged with the first bucket, merged with the second bucket, or placed into a new bucket (and the previous first or second buckets merged with each other). As a result, relatively lower response time samples may be clustered together in a resultant low bucket, and relatively higher response time samples may be clustered together in a resultant high bucket.

The low and high buckets may then be aggregated into a final value which is indicative of response time experience over the given time frame (operation 213). In some embodiments, the buckets cannot be meaningfully averaged using a weighted average calculation because the number of samples in each of the two buckets may be very different and the averages of the samples within each bucket may also be very different. For example, the low bucket may have 20 samples with an arithmetic mean of 10 ms, and the high bucket may have 5 samples with an arithmetic mean of 500 ms. In other words, 80% of the time, the response time was relatively rapid (e.g., on the order of 10 ms), but in 20% of the time, the response time was relatively slow (e.g., on the order of 500 ms. Qualitatively, the response time (and by extension, the quality of experience of the users of client devices 120) was good for most part with some exceptions.

Thus, in some embodiments, a first ratio may be calculated of the smaller number of samples of either the low bucket or the high bucket to the greater number of samples of the two buckets. A second ratio may be calculated of the difference between the averages of the two buckets to the greater of the averages of the two buckets. The first and second ratios may be multiplied together, and the result may be multiplied with the absolute value of the difference between the averages of the two buckets. In some embodiments, a weighting value may be used to weight more heavily the first ratio.

As discussed above, the access point 110 may obtain information related to one or more metrics and report the obtained information related to the one or more metrics. Although the metrics reported by the access points 110 may have standalone value to a network administrator or operator, aspects of the present disclosure are based on the recognition that some values, such as the response times discussed above, may have values within an indefinite range: a response time may be 5 ms or 5000 ms. Additionally, whether a response time (or other metric) is 'good' is relative; a response time of 5000 ms may be acceptable if the application server 150 is geographically remote and/or located on a network with low bandwidth or throughput characteristics.

In some embodiments, the information obtained may be reported to the analytics system 160. The analytics system 160 may map metrics, such as QoE metrics, that are in an indefinite value range to normalized QoE scores in a definite range. In some embodiments, the analytics system 160 may perform normalized ranking. Although this may be adaptive to spatial and temporal contexts, a large amount of training samples may be needed in order to obtain an accurate empirical cumulative distribution function (ECDF). Additionally, comprehensive training scenarios may be needed to avoid overfitting (e.g., if the training is done in a network where response times are generally large, response time samples are likely to be mapped to a "worse" score than deserved.) Furthermore, a large number of variables may be needed to represent/store the model that performs the normalized ranking.

Aspects of the present disclosure are based on the recognition that many QoE metrics may have a unimodal distribution, or more specifically a Gaussian distribution with a "bell-shape" probability density function (PDF). Furthermore, many QoE metrics exhibit directionality. For example, a relatively smaller response time is more desirable than a relatively larger response time, and thus the relatively smaller response time should be mapped to a QoE score that is closer to 1. On the other hand, a relatively smaller throughput is less desirable than a relatively larger throughput, and thus it the relatively smaller throughput should be mapped to a QoE score that is closer to 0.

Figure 6:
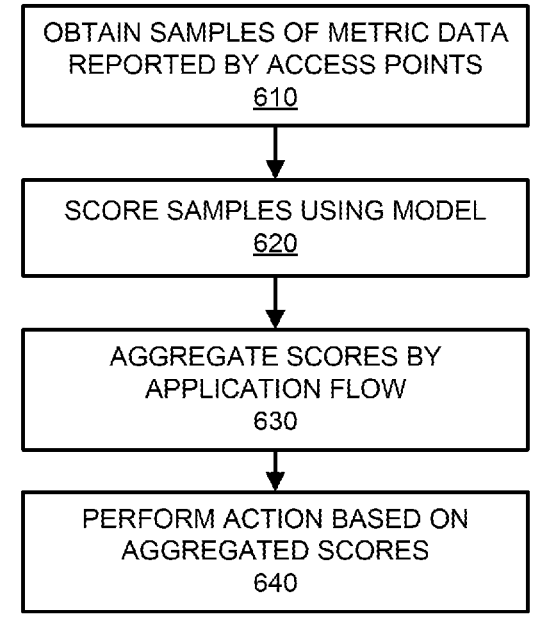
FIG. 6 is a flow chart illustrating operations of methods for an electronic device to perform analytics in a wireless local area network according to embodiments of the present disclosure.

Thus, in some embodiments, unsupervised machine learning using a parametric method may be used. FIG. 6 is a flow chart illustrating operations of methods for the analytics system 160 to perform analytics in a wireless local area network according to embodiments of the present disclosure. The analytics server 160 may obtain samples of metric data reported by access points (operation 610). The analytics server may then score the samples (or a subset of the samples) using a model (operation 620).

Figure 7:
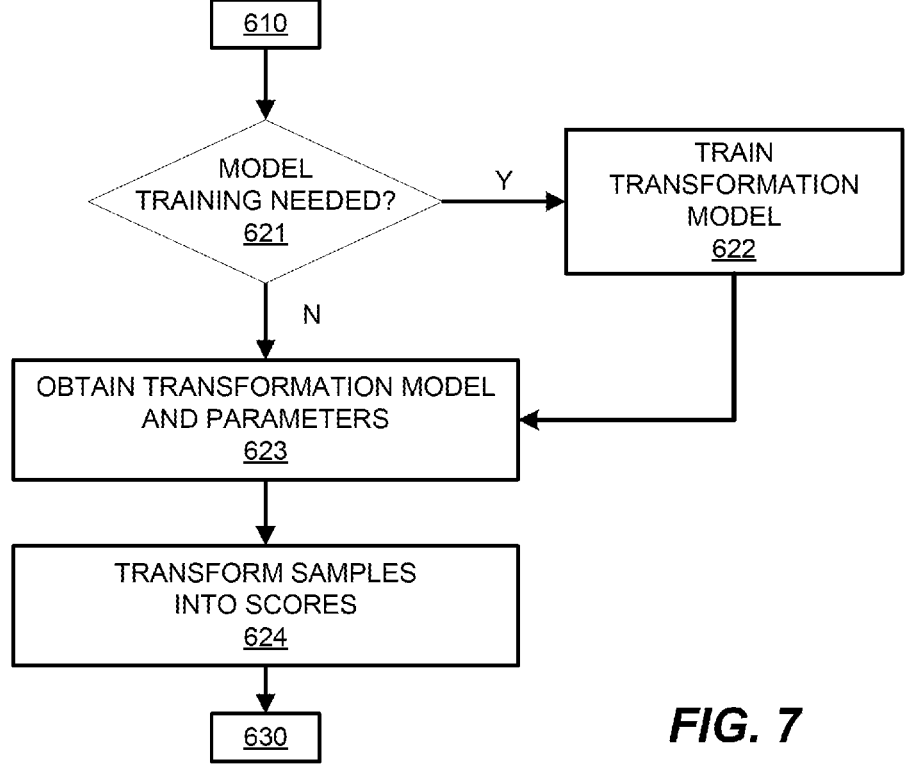
FIG. 7 is a flow chart illustrating operations of methods for an electronic device to score obtained samples of metric data according to embodiments of the present disclosure.

FIG. 7 is a flow chart illustrating in greater detail the scoring of obtained samples of metric data according to embodiments of the present disclosure. In some embodiments, the model may be initially trained and/or periodically trained using training data. Accordingly, after samples of metric data reported by access points are obtained, the analytics system 160 may decide whether training is needed (operation 621), and if so ("Y" branch from operation 621) train the model accordingly (operation 622). If training is not needed ("N" branch from operation 621) or once training is completed, then a model to transform QoE metric data to QoE scores may be obtained from a data score along with parameters (operation 623). The transformation model and parameters may then be used to transform QoE metric data to QoE scores (operation 624).

One example of a transformation model is a parametric model based on a modified sigmoid function, although the present disclosure is not limited thereto.

The sigmoid function is a mathematical function that has an "S-curve" or "switch" characteristics," and is similar to the cumulative distribution function (CDF) of a Gaussian distribution. A sigmoid function is centrally symmetrical; the modified sigmoid function according to the present disclosure introduces a skewness element so that the skewness of the distribution can also be approximated. The modified sigmoid function also includes a directionality flag, where a "positive" mapping maps large values closer to 1, and "negative" mapping maps a large value to 0.

Figure 8A:
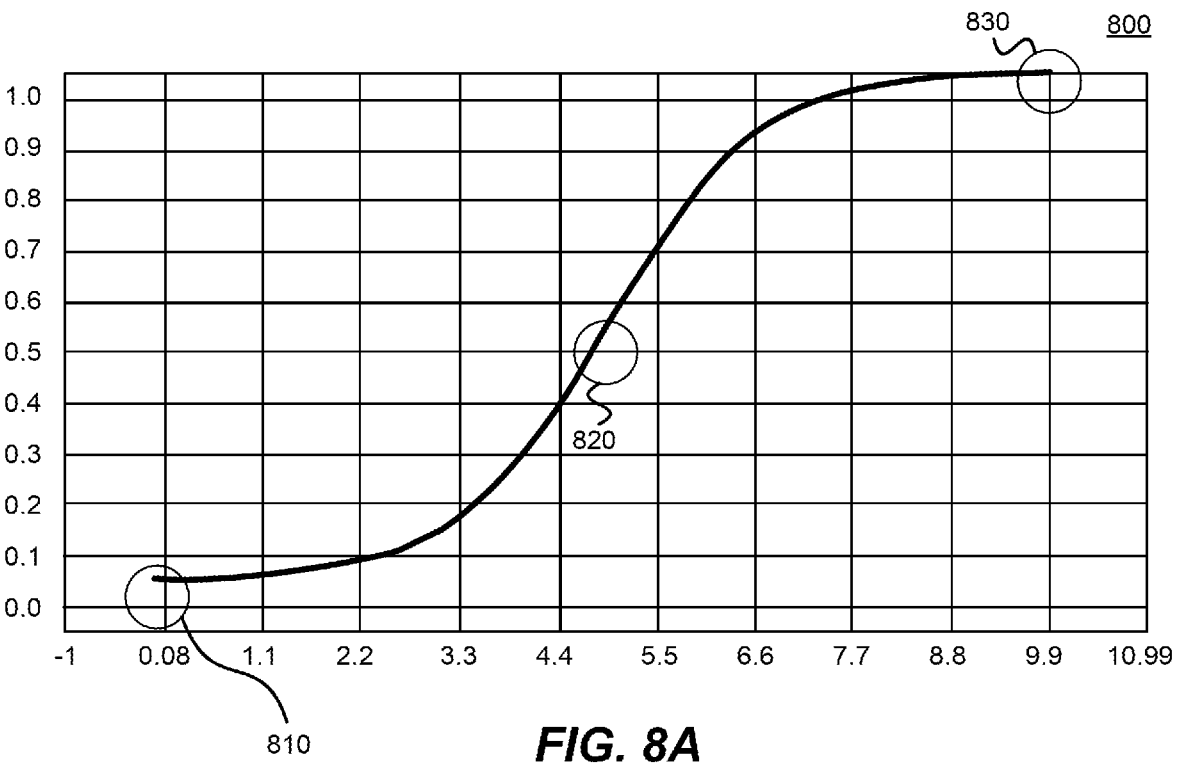
FIGS. 8A-B are schematic drawings illustrating examples of scoring models according to embodiments of the present disclosure.
Figure 8B:
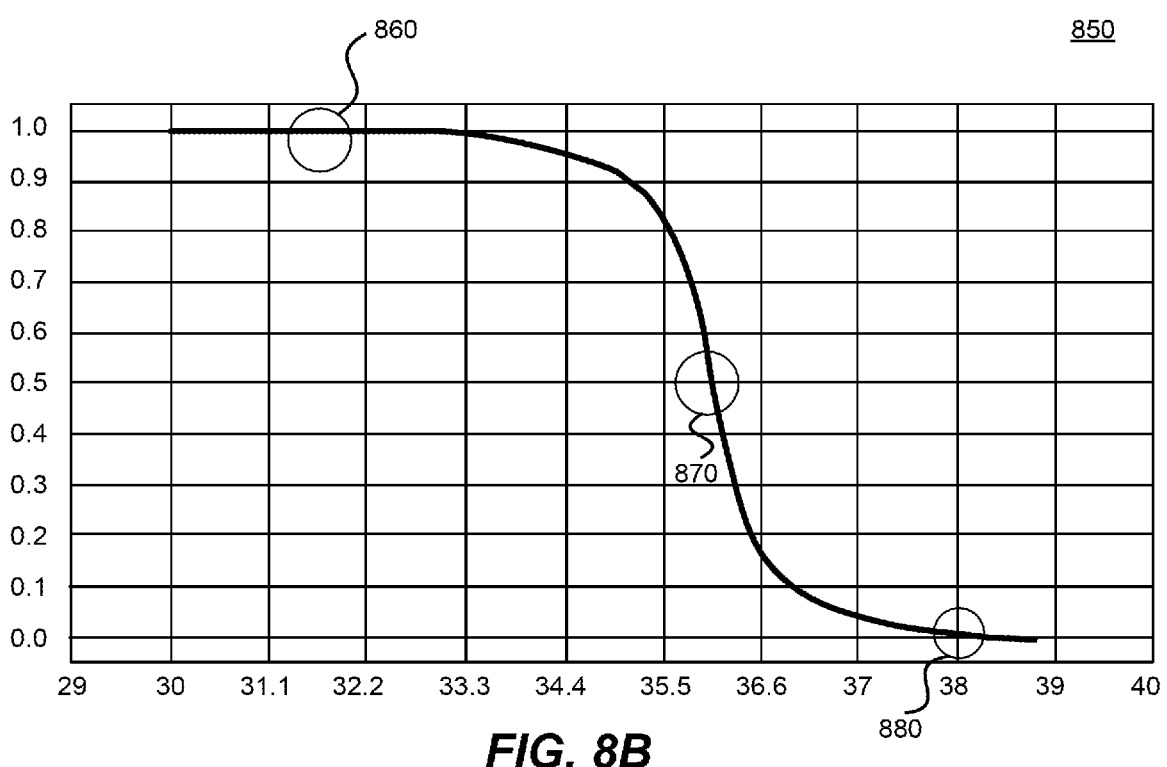

FIGS. 8A-B are schematic drawings illustrating examples of scoring models according to embodiments of the present disclosure. As seen in FIGS. 8A and 8B, a modified Sigmoid function to approximate the ECDF of a QoE metric may be anchored using 3 values: min, median, max. FIG. 8A represents a modified sigmoid function 800 having a positive directionality and minimum 810, median 820, and maximum 830, and FIG. 8B represents a modified sigmoid function 850 having a negative directionality and minimum 860, median 870, and maximum 880.

The modified sigmoid function can be represented by the following equations:

$$y = \begin{cases} \dfrac{1}{1 + e^{-\alpha*(x - x_{median})}}, & \text{when } f = \text{"positive"} \\ 1 - \dfrac{1}{1 + e^{-\alpha*(x - x_{median})}} & \text{when } f = \text{"negative"} \end{cases}$$

$$\alpha = \begin{cases} \dfrac{C}{x_{max} - x_{median}} & \text{when } x \geq x_{median} \\ \dfrac{C}{x_{median} - x_{min}} & \text{when } x < x_{median} \end{cases}$$

In the equations above: x denotes the QoE metric (e.g., response time) for a sample (in an indefinite value range), and y denotes the QoE score (between 0 and 1, i.e., in a definite value range). $x_{min}$, $x_{max}$, and $x_{median}$ denote the minimum, maximum, and median of the set of samples. $x_{min}$, $x_{max}$, and $x_{median}$ may be obtained from a set of training data or explicitly assigned. f denotes the mapping direction flag and may be either positive (e.g., higher values are better) or negative (lower values are better). $\alpha$ denotes a scaling factor of the modified Sigmoid function, and C may denote a constant having a predetermined value that controls a speed at which the QoE metric converges to 0 or 1 when it deviates from its median. In some embodiments, a value of C may be in the range of 5-10 inclusive.

Returning now to FIG. 6, after the samples are scored, the normalized QoE scores may be aggregated for reporting on a per-client basis, per-application server basis, per-application flow basis, and/or on the basis of another criterion (operation 630). For example, a simple arithmetic mean can be used for the aggregation to obtain the QoE score for an application server 150 and/or for a flow of transfer units.

Figure 9:
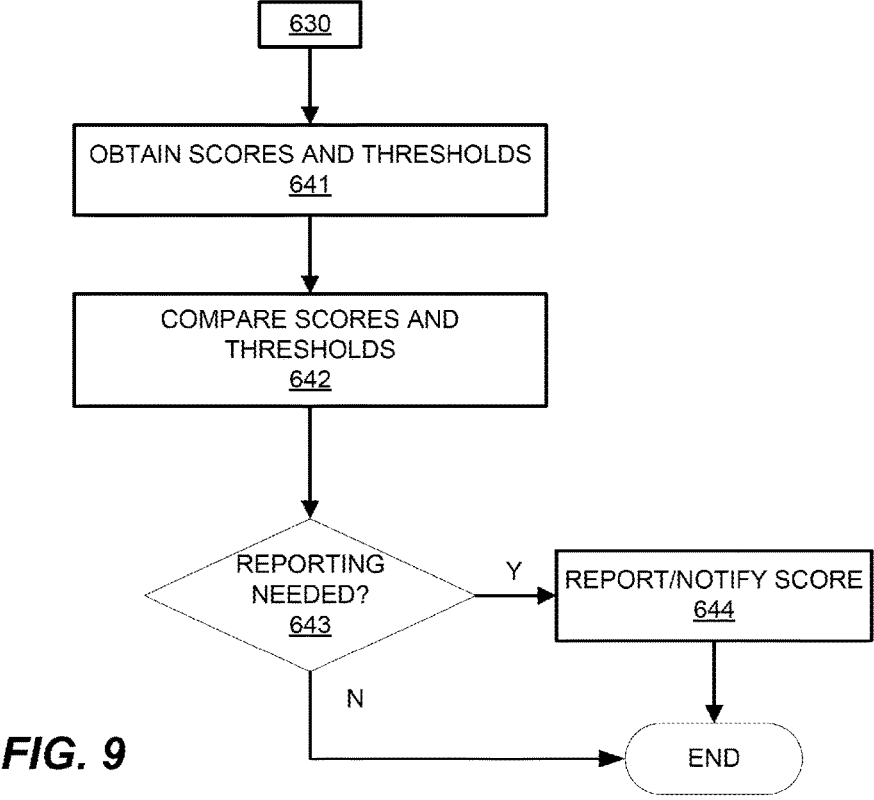
FIG. 9 is a flow chart illustrating operations of methods for an electronic device to report or notify scores that have been compared with a threshold according to embodiments of the present disclosure.

The aggregated data may be reported, and/or another action may be performed (operation 640). FIG. 9 is a flow chart illustrating operations of methods for an electronic device to report or notify scores that have been compared with a threshold according to embodiments of the present disclosure. For example, at least some of the aggregated scores may be obtained, along with reporting thresholds (operation 641). A comparison may be made between the aggregated scores and the reporting thresholds (operation 642), and a decision may be made whether the comparison indicates that reporting is needed (operation 643). If reporting is needed ("Y" branch from operation 643), the reporting may be performed (operation 644).

For example, a QoE score for a particular application flow may be compared against first and second thresholds to determine the QoE score rating for the application flow. If the QoE score is greater than both thresholds, the QoE score may be marked as "good." If the QoE score is between the first and second thresholds, the QoE score may be marked as "average." If the QoE score is below both thresholds, the QoE score may be marked as "poor."

In some embodiments, the first and second thresholds for QoE score rating may be explicitly assigned, e.g., by a network operator or administrator. In some embodiments, the analytics system 160 may derive the first and second thresholds from historic values.

In some embodiments, an alarm and/or a notifications may be communicated to a remote device (e.g., a device remote from analytics system 160) when certain pre-set conditions are triggered. For example, an alert may be sent if in a given period of time data flows associated with a website (e.g., an online video sharing platform) in a certain network have QoE ratings below or equal to "average."

In accordance with the above, in some embodiments an unsupervised machine learning model may analyze a data set comprising response times or page download times corresponding to all or part of a web page. The responses may be HTTPS responses that are encrypted. The model may calculate first and second watermark levels, where values above the first watermark level correspond to a good QoE, values below the second watermark level correspond to a poor QoE, and values between the watermark levels are average. Using these values, subsequent response times can be categorized into good, average, and bad experiences with respect to an application server. Additionally, a response time fluctuation analysis may be enabled.

The present disclosure is not limited to the above-discussion of response times or page download times, and other metrics that are associated with and/or affect QoE may be considered. For example, one metric associated with QoE may be latency, which may encompass the time it takes for data to pass from one point in a network to another. For example, as requests and responses (e.g., the HTTP and TCP requests and responses discussed above) traverse networks, a typical transfer unit may be forwarded over multiple links and gateways, each resulting in a transmission time as well as some amount of delay. For example, each link or gateway will typically not begin to forward the transfer unit until it has been completely received. The links and gateways over which a transfer unit is to be communicated may service other traffic, and there may be queuing delays until the transfer unit can be communicated. A small amount of processing delay may be incurred while a gateway determines what to do with a newly received transfer unit. Latency may be a sum of, for example, at least the transmission delay of each link, plus the forwarding latency of each gateway, queuing delays, and/or processing delays. With reference to FIG. 10, which is a block diagram illustrating a very simple, example system 1000, latency may occur both on a local area network (LAN) (e.g., communication in a WiFi network 100 between a client device 120 and an access point 110) and on a wide area network (WAN) (e.g., communication between the access point 110 and the application server 150 processing requests from the client device 120. Latency occurring on a LAN may be referred to as LAN latency, and latency occurring on a WAN may be WAN latency.

FIGS. 11A and 11B are flow charts illustrating operations of methods for an electronic device to perform analytics in a wireless local area network according to embodiments of the present disclosure. FIGS. 11A and 11B elaborate on FIG. 2 and provide greater detail in the example of obtaining and reporting QoE metric data associated with latency. In the operations of FIG. 11A and FIG. 111B, the access points 110 (and, in some embodiments, other electronic devices of the WiFi network 100) may receive transfer units (such as packets, frames, segments, or the like) from the client device 120 and from the application server 150 and calculate latency values for the LAN and/or WAN, e.g., LAN latency and WAN latency values (operation 1111).

Methods of calculating latency values for the LAN and/or WAN may include receiving and collecting timestamps for two or more transfer units travelling between the client device 120 and the application server 150, and then calculating a difference between the two timestamps. Examples are described with reference to FIGS. 12A-B, which are schematic drawings illustrating examples of transfer units for communication. FIG. 12A illustrates a three-way handshake process in which a reliable connection (e.g., a TCP connection) is established between a client device 120 and an application server 150. Initially, the client device 120 transmits to the application server 150 a SYN transfer unit, which is responded to by the application server 150 with a SYN-ACK transfer unit; which in turn is responded to by the client device 150 with an ACK transfer unit. Each of the three transfer units (SYN, SYN-ACK, and ACK) may be received and forwarded by the access point 120, and a timestamp of when each transfer unit is received by the access point 120 may be recorded. The collection process of latency metric data may include calculating a time difference between when the SYN and SYN-ACK transfer units are received by the access point 120 as a WAN latency value, and between when the SYN-ACK and ACK transfer units are received by the access point 120 as a LAN latency value. As discussed above, identifiers from the transfer unit, such as source address, destination address, source port, destination port, and protocol (e.g., TCP, HTTP, HTTPS) may be used to identify and group the transfer units prior to calculating the latency values.

FIG. 12B illustrates a three-packet handshake process in which an unreliable connection (e.g., a UDP connection) is used between a client device 120 and an application server

150. An example of such a process is provided by QUIC, a protocol that uses an HTTPS over UDP protocol. Initially, the client device 120 transmits to the application server 150 an encrypted first packet, which is responded to by the application server 150 with an encrypted second packet; which in turn is responded to by the client device 150 with an encrypted third packet. Each of the three initial packets may be received and forwarded by the access point 120, and a timestamp of when each initial packet is received by the access point 120 may be recorded. The collection process of latency metric data may include calculating a time difference between when the first and second initial packets are received by the access point 120 as a WAN latency value, and between when the second and third initial packets are received by the access point 120 as a LAN latency value. Identifiers from or associated with the initial packets, such as source address, destination address, source port, destination port, and protocol may be used to identify and group the initial packets prior to calculating the latency values. In some embodiments, the protocol may be a higher-layer protocol. The higher-layer protocol may be identified using a protocol version number present in data (including encrypted data). For example, QUIC application data packets may be recognized via examination of three bits of data within the header thereof. For example, if the $4^{th}$ and $5^{th}$ bits are a '0' value, and the $7^{th}$ bit is a '1' value, the packet may be a QUIC initial packet.

Returning now to FIGS. 11A and 111B, in some embodiments the access point 110 may communicate determined latency values to the analytics system 160 for further analysis and calculation thereon (operation 1122 of FIG. 11B). In some embodiments and as seen in FIG. 11A, after the latency values are determined, the access point 110 (or the analytics system 160) may cluster the latency values and perform averaging or other calculating based on the clusters (operation 1112). The averages of the clusters may be then aggregated to provide a more representative metric of the latency values (operation 1113) prior to the reporting thereof (operation 1121). Operations 1112, 1113, 1121, and 1122 may be similar to the operations 212, 213, 221, and 222 discussed above, differing only in their application to latency values rather than page download times. Reference is therefore made herein to the previous descriptions of operations 212, 213, 221, and 222 in the interest of brevity.

In some embodiments, for example where latency is a considered metric, a degree of consistency or inconsistency in latency may represent a measure of health of an application or of a network. For example, if latency of a WAN over a first time range is measured consistently on the order of approximately ten milliseconds (e.g., 10 ms for a first data point, 12 ms for a second data point, 8 ms for a third data point, and 11 ms for a fourth data point), the WAN may be considered to have acceptable performance. If the latency of the WAN over a second time range is measured consistently on the order of approximately one second (e.g., 1000 ms for a fifth data point, 1200 ms for a sixth data point, 800 ms for a seventh data point, and 1100 ms for a eight data point), the WAN may still be considered to have acceptable performance, even though the latency has increased, as the latency may be reflective of increased traffic present at the second time range that was absent from the first time range.

On the other hand, if latency of the WAN over a time range is inconsistent (e.g., 10 ms for a first data point, 1200 ms for a second data point, 8 ms for a third data point, 11 ms for a fourth data point, 17 ms for a fifth data point, 1900 ms for a sixth data point), the WAN may be considered to have non-acceptable performance. In other words, a high degree of fluctuation may be indicative of a potential configuration problem in the WAN.

With reference to the above discussion of clustering, another way in which data values according to the present disclosure may be clustered may use the Jenks Natural Breaks Classification (JNBC) algorithm. The JNBC identifies "natural breaks," which may be considered appropriate locations at which to split ranges of data values. For example, the JNBC may identify groups or clusters of data values where the variance within each group is minimized and the variance between groups is maximized. The JNBC clusters may be used to identify a dispersion ratio, which may indicate (for example) a degree of spread or fluctuation for data values of a metric. FIG. 13 is a flow chart illustrating operations of methods for an electronic device to perform JNBC clustering in a wireless local area network according to embodiments of the present disclosure. The JNBC clustering may be performed for example, on QoE scores, latency values, page download times, or other metrics described herein.

In operation 1310, samples (e.g., samples of QoE scores, latency values, page download times, or other metrics) may be acquired. If only one sample is acquired, the dispersion ratio may be defined to be as not applicable. On the other hand, if more than one sample is acquired, then in operation 1320, the set of samples may be analyzed and a consistency of the samples may be determined. For example, a standard deviation of the set of samples may be calculated and compared with a first predetermined threshold. If the standard deviation is below the first predetermined threshold, then the set of samples may be considered to be sufficiently consistent ("Y" branch from operation 1320), and in operation 1322 the dispersion ratio may be set to be zero.

If the samples are not consistent enough, i.e., the standard deviation equals or exceeds the first predetermined threshold ("N" branch from operation 1320), then a group number C may be defined to be two (operation 1324), and the Jenks Natural Breaks Classification algorithm may be used to separate the set of samples into C groups (operation 1326), such that samples within each individual group become consistent enough. In other words, two groups may be formed where the variance within each of the two groups is minimized while the variance between the two groups is maximized.

In operation 1328, the consistency of each group is then checked. For example, a standard deviation for each group may be calculated. The largest standard deviation of the groups may be selected, and the largest group standard deviation may be compared with a second predetermined threshold (which may be the same as the first predetermined threshold used in operation 1320, or a different predetermined threshold). If the largest group standard deviation is below the second predetermined threshold, the groups of samples may be considered to be sufficiently consistent ("Y" branch from operation 1328), and in operation 1332 the dispersion ration may be calculated based on the largest group (which may or may not be the group having the largest group standard deviation). For example, the dispersion ratio may be calculated as $d=1-G_{PRI}/N$, where N=the number of samples in the set, and $G_{PRI}$=the size of the group with the maximum number of samples.

If the largest group standard deviation is equal to or greater than the second predetermined threshold, the groups of samples may be considered to be not sufficiently consistent ("N" branch from operation 1328), and the process may proceed to operation 1330, where the group number C is incremented. The process may then return to operation 1326, where the Jenks Natural Breaks Classification algorithm is used to separate the set of samples into C groups. In other words, three groups may now be formed where the variance within each of the three groups is minimized while the variance between the three groups is maximized. The process may continue in this way until C groups are found to be sufficiently consistent and dispersion ratio is calculated for the largest of the C groups.

FIG. 14 is a block diagram illustrating an electronic device 900 in accordance with some embodiments. The electronic device 900 may be, for example, one of the access points 110, one of the client devices 120, or the application server 150 illustrated in FIG. 1. The electronic device 900 includes a processing subsystem 910, a memory subsystem 912, and a networking subsystem 914. Processing subsystem 910 includes one or more devices configured to perform computational operations. Memory subsystem 912 includes one or more devices for storing data and/or instructions. In some embodiments, the instructions may include an operating system and one or more program modules which may be executed by processing subsystem 910.

Networking subsystem 914 includes one or more devices configured to couple to and communicate on a wired and/or wireless network (i.e., to perform network operations), including: control logic 916, an interface circuit 918 and one or more antennas 920 (or antenna elements). While FIG. 14 includes an antenna 920, in some embodiments electronic device 900 includes one or more nodes, such as nodes 908, e.g., a connector, which can be coupled to one or more antennas 920 that are external to the electronic device 900. Thus, electronic device 900 may or may not include the one or more antennas 920. Networking subsystem 914 includes at least a networking system based on the standards described in IEEE 802.11 (e.g., a Wi-Fi networking system).

Networking subsystem 914 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 900 may use the mechanisms in networking subsystem 914 for performing simple wireless communication between the electronic devices, e.g., transmitting frames and/or scanning for frames transmitted by other electronic devices.

Processing subsystem 910, memory subsystem 912, and networking subsystem 914 are coupled together using bus 928. Bus 928 may include an electrical, optical, and/or electro-optical connection that the subsystems can use to communicate commands and data among one another.

Electronic device 900 can be (or can be included in) any electronic device with at least one network interface. For example, electronic device 900 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

The operations performed in the communication techniques according to embodiments of the present disclosure may be implemented in hardware or software, and in a wide variety of configurations and architectures. For example, at least some of the operations in the communication techniques may be implemented using program instructions 922, operating system 924 (such as a driver for interface circuit 918) or in firmware in interface circuit 918. Alternatively or additionally, at least some of the operations in the communication techniques may be implemented in a physical layer, such as hardware in interface circuit 918.

Embodiments of the present disclosure have been described above with reference to the accompanying drawings, in which embodiments of the inventive concepts disclosed herein are shown. The inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive concepts. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, operations, elements, and/or components, but do not preclude the presence or addition of one or more other features, operations, elements, components, and/or groups thereof.

Aspects and elements of all of the embodiments disclosed above can be combined in any way and/or combination with aspects or elements of other embodiments to provide a plurality of additional embodiments.

What is claimed is:

1. A method comprising:

receiving, at an access point of a wireless network, a first transfer unit of a plurality of upstream transfer units, the first transfer unit comprising first data destined for a first destination;

forwarding, by the access point, the first transfer unit that was received by the access point, to the first destination;

receiving, at the access point, a second transfer unit of a plurality of downstream transfer units, the second transfer unit comprising second data destined for a second destination;

forwarding, by the access point, the second transfer unit received by the access point to the second destination;

receiving, at the access point, a third transfer unit comprising third data destined for the second destination, wherein the second transfer unit and the third transfer unit are both responsive to the first transfer unit;

grouping, by the access point, the plurality of upstream transfer units and the plurality of downstream transfer units into a plurality of groups, a first group of the plurality of groups comprising a single upstream transfer unit comprising the first transfer unit and at least two of the plurality of downstream transfer units comprising the second transfer unit and the third transfer unit, wherein the grouping is based on respective statistical variances within each group of the plurality of groups and respective statistical variances between ones of the plurality of groups; and calculating, by the access point and based on the first, second, and third transfer units of the group that are received by the access point, a response time associated with the first destination based on a time difference between the receiving of the first transfer unit at the access point and the receiving a later one of the second transfer unit and the third transfer unit at the access point, wherein the access point comprises at least one radio used to provide wireless network coverage in an area, and wherein the first transfer unit comprises a request and the second transfer unit and the third transfer unit each comprises a response.

2. The method of claim 1, wherein the first transfer unit is received from a client device in the area provided with wireless network coverage by the access point.

3. The method of claim 1, wherein the first destination is a web application server.

4. The method of claim 1, wherein the first transfer unit and the second transfer unit each comprises encrypted content.

5. The method of claim 1, wherein the first transfer unit and the second transfer unit each comprises HyperText Transfer Protocol Secure (HTTPS) formatted data.

6. The method of claim 5, wherein the first transfer unit comprises an HTTPS request and the second transfer unit comprises an HTTPS response.

7. The method of claim 1, wherein the first transfer unit and the second transfer unit comprises a Transmission Control Protocol (TCP) stream, an Internet Protocol (IP) packet, and/or an Ethernet frame.

8. The method of claim 1, further comprising receiving a fourth transfer unit comprising fourth data destined for the first destination.

9. The method of claim 1, wherein the grouping, by the access point, the first, second, and third transfer units into the first group comprises indexing each of the first, second, and third transfer units using a common indexing identifier.

10. The method of claim 9, wherein the indexing is based on at least one address associated with the first transfer unit.

11. The method of claim 1, further comprising:

obtaining a set of samples of metric data reported by the access point, wherein the samples are within an indefinite value range;

scoring the samples using a transformation model, resulting in scores that are within a definite value range;

aggregating the scores; and clustering the scores into at least two groups, each of the two groups having a standard deviation of the scores within a respective one of the two groups that is below a predetermined threshold.

12. The method of claim 1, wherein the statistical variances within each group of the plurality of groups is minimized and the statistical variances between ones of the plurality of groups is maximized.

13. A method comprising:

receiving, by an access point of a wireless network, a first transfer unit of a plurality of upstream transfer units, the first transfer unit comprising encrypted first data destined for a first destination;

associating a first timestamp corresponding to the first transfer unit received at the access point to a first indexing identifier;

forwarding, by the access point, the first transfer unit that was received by the access point, to the first destination;

receiving, at the access point, a second transfer unit of a plurality of downstream transfer units, the second transfer unit comprising encrypted second data destined for a second destination;

forwarding, by the access point, the second transfer unit received by the access point to the second destination;

receiving, at the access point, a third transfer unit comprising third data destined for the second destination, wherein the second transfer unit and the third transfer unit are both responsive to the first transfer unit;

grouping, by the access point, the plurality of upstream transfer units and the plurality of downstream transfer units into a plurality of groups, a first group of the plurality of groups comprising a single upstream transfer unit comprising the first transfer unit and at least two of the plurality of downstream transfer units comprising the second transfer unit and the third transfer unit, wherein the grouping is based on respective statistical variances within each group of the plurality of groups and respective statistical variances between ones of the plurality of groups;

associating a second timestamp corresponding to the second transfer unit and the third transfer unit received at the access point to the first indexing identifier; and calculating, by the access point, a response time of a portion of a communication network based on a difference between the first timestamp and the second timestamp, wherein the access point comprises at least one radio used to provide wireless network coverage in an area.

14. The method of claim 13, wherein the first transfer unit is received from a client device in the area provided with wireless network coverage by the access point.

15. The method of claim 13, wherein the first destination is a web application server.

16. The method of claim 13, wherein the first transfer unit and the second transfer unit each comprises HyperText Transfer Protocol Secure (HTTPS) formatted data.

17. The method of claim 13, wherein the first transfer unit comprises a HyperText Transfer Protocol Secure (HTTPS) request and the second transfer unit comprises an HTTPS response.

18. The method of claim 13, wherein the first transfer unit and the second transfer unit comprises a Transmission Control Protocol (TCP) stream, an Internet Protocol (IP) packet, and/or an Ethernet frame.

19. A method comprising:

receiving, by an access point of a wireless network, a plurality of upstream transfer units comprising encrypted first data destined for a first destination;

associating a first timestamp corresponding to an earliest received of the plurality of upstream transfer units received by the access point to a first indexing identifier;

forwarding, by the access point, the plurality of upstream transfer units that were received by the access point to the first destination;

receiving, at the access point, a plurality of downstream transfer units comprising encrypted second data destined for a second destination, wherein the plurality of downstream transfer units comprise a second transfer unit and a third transfer unit that are both associated with a first transfer unit of the plurality of upstream transfer units;

associating a second timestamp corresponding to a last received of the plurality of downstream transfer units received by the access point to the first indexing identifier;

forwarding, by the access point, the plurality of downstream transfer units that were received by the access point to the first destination;

grouping, by the access point, the plurality of upstream transfer units and the plurality of downstream transfer units into a plurality of groups, a first group of the plurality of groups comprising a single upstream transfer unit comprising the first transfer unit and at least two of the plurality of downstream transfer units comprising the second transfer unit and the third transfer unit, wherein the grouping is based on respective statistical variances within each group of the plurality of groups and respective statistical variances between ones of the plurality of groups; and calculating, by the access point, a response time of a portion of a communication network associated with the group based on a difference between the first timestamp and the second timestamp, wherein the access point comprises at least one radio used to provide wireless network coverage in an area.

20. The method of claim 19, wherein each of the plurality of upstream transfer units and each of the plurality of downstream transfer units comprises a Transmission Control Protocol (TCP) stream, an Internet Protocol (IP) packet, and/or an Ethernet frame.

* * * * *